United States Patent [19]

Harendza-Harinxma

[11] 3,946,101
[45] Mar. 23, 1976

[54] FILTERING MATERIAL
[75] Inventor: Alfred J. Harendza-Harinxma, Lawrenceville, N.J.
[73] Assignees: Alfred J. Harendza-Harinxma, Lawrenceville; Peter J. Catanese, Trenton; Samuel A. LaPaglia; Deane W. Merry, both of Pennington, all of N.J. ; part interest to each
[22] Filed: July 10, 1973
[21] Appl. No.: 378,011

Related U.S. Application Data
[60] Division of Ser. No. 210,043, Dec. 20, 1971, abandoned, which is a continuation of Ser. No. 69,760, Sept. 4, 1970, abandoned.

[52] U.S. Cl. .............. 423/210; 131/265; 131/266; 260/212; 423/213.2; 423/230; 423/239; 423/244; 423/245; 423/247
[51] Int. Cl.² ......................................... B01D 53/34
[58] Field of Search ........ 423/210, 213.2, 230, 239, 423/244, 245, 247; 260/212; 131/265, 266

[56] References Cited
UNITED STATES PATENTS
3,007,917  11/1961  Pauling ............................. 260/212
3,372,979  3/1968  Reinhardt et al. ................. 260/212

Primary Examiner—T. Tung

[57] ABSTRACT

A fluid filter, especially useful for cigarettes and the like, comprises cellulose which has been oxidized by an inorganic metal nitrate, such as manganese nitrate.

Other constituents, such as activated charcoal, tobacco, powdered pumice and thermoplastics may be added to the oxidized cellulose to modify the filtering action. The filter may also have application in the automobile industry.

4 Claims, No Drawings

FILTERING MATERIAL

This is a division of application Ser. No. 210,043 filed Dec. 20, 1971, now abandoned, which was a continuation of Ser. No. 69,760 filed Sept. 4, 1970, now abandoned.

BACKGROUND OF THE INVENTION 1. a Field of the Invention

Broadly speaking, this invention relates to filtration. More particularly, in a preferred embodiment, this invention relates to the filtration of noxious and offensive gases, particulate material and vapors, from the atmosphere.

2. b Description of the Prior Art

The rapid increase in the death rate due to lung cancer, emphysema, bronchitis and similar respiratory diseases has been traced to the growing amount of pollution in the air we breath, including the so-called "personal air-pollution" caused by cigarette smoking. The number of pollutants in the atmosphere are too numerous to list in detail but some of the principal components comprise carbon monoxide and lead from automobile exhausts; sulphur dioxide and soot from the burning of fossil fuel; and, in the case of cigarettes, nicotine, acrolein, phenol, tars, organic acids such as alcohol, acetic acid, ketones, esters, and other hydrocarbons and carbon dioxide, carbon monoxide and oxides of nitrogen.

Medical research has proved beyond doubt that many of the above-described pollutants are carcinogenic and some, such as acrolein ($CH_2:CH.CHO$), are ciliastatic, that is to say they paralyze the cilia which line the trachea and bronchioles. Normally, these whip-like appendages beat to and fro, in rhythmic fashion, and by this action carry foreign bodies up and out of the respiratory tract, thereby preventing foreign particulate matter from accumulating in the respiratory system. When the activity of the cilia is inhibited by acrolein or similar pollutants, harmful particulate material, including in the case of cigarette smoking any tar particles contained in the smoke, easily pass by the paralyzed cilia and collect in the lungs.

In view of the pressing health problem, vast research projects have been conducted, particularly in the cigarette industry, in an attempt to find a filter which will attenuate, or better still, eliminate most of these harmful elements. Unfortunately, the results to date have not been spectacular. While the smoker of a commercially manufactured filter cigarette is undoubtedly better off than if he were smoking a non-filtered cigarette, he nevertheless, runs a significant risk of contracting bronchitis or emphysema or other more dangerous illnesses.

Commercially available cigarette filters typically comprise a solid absorbent, such as activated charcoal or silica gel, sandwiched between a pair of cellulose acetate filter plugs. This type of filter removes from the tobacco smoke a proportion of the liquid or semi-liquid droplets passing through it. This is accomplished by a combination of diffusional, impactive, and direct collision of the droplets with the filter fibers. Upon collision, the droplets are retained on the fibers by the surface attraction between the extremely small particles and the relatively large fiber. Such fibrous filters are, however, not particularly effective for removing vaporized components from the smoke stream by the processes of physical and chemical adsorption. The smooth and non-porous nature of the commonly used fibrous filtering materials, while effective in capturing tobacco smoke droplets, does not present a sufficient surface area to effectively adsorb gaseous molecules. It has been calculated that an ordinary cellulose acetate cigarette filter plug has a surface area ranging from 1,000 to 10,000 square centimeters per gram of material. This affords insufficient surface area for effective adsorption of gaseous molemules, and has no significant selectivity. In some instances, where a vaporized material is sufficiently soluble in the fibrous material so that its surface concentration is rapidly depleted, a significant removal can be achieved by the process of absorption. An example of such a material present in tobacco smoke is phenol, which has a pronounced solubility in cellulose acetate filtering material. Cellulose acetate filters allow both hydrogen cyanide and hydrogen sulfide to pass through in undesirably high concentration.

In attempts to improve the adsorptive properties of tobacco smoke filters, various treatments of ordinary filtering material and various new fibrous filtering materials have been proposed. Among the materials and treatments proposed, a number of well-known adsorbants such as activated charcoal, alumina, natural and synthetic clays and silica gel have been proposed as additives to tobacco smoke filters. These materials are classified as absorbents and are used in gas-stream treatment because they possess in common the characteristic that their specific surface area exceeds a million square centimeters per gram of material. A good rule of gas adsorbent quality activated carbon, for example, has a specific surface area in excess of 5 million square centimeters per gram. In general, the preferred method heretofore used of including these adsorbents in tobacco filters has been by dusting, spraying, tumbling, slurrying, or otherwise incorporating the finely-divided adsorbent into the fibrous material which forms the filter or a part thereof.

Such adsorbent-containing tobacco smoke filters are only partially effective for several reasons. One is that the adsorbent is often rendered ineffective by the incorporation process and subsequent handling in the cigarette manufacturing and distribution process, in that water, plasticizing agents, glues, adhesives and volatile flavoring materials, in prolonged close contact with the finely-divided adsorbent, partially or completely utilize the adsorbent surface, thus decreasing its capacity to adsorb gaseous molecules from the smoke stream.

Another reason is that when adsorbent and fibrous filtering materials are intimately mixed, condensed droplets tend to be deposited in such a filter on or near an adsorbent particle, with the result that relatively nonvolatile smoke constituents quickly permeate the adsorption and thus reduce its capacity for adsorption of gaseous molecules.

Further disadvantages of such known adsorbent filters are that the inclusion of considerable quantities of adsorbent in a tobacco smoke filter has both a marked effect upon the draw resistance of the smoking article, and upon the taste of the smoke stream. A powdered of finely divided adsorbent dispersed in a matrix of fibrous filtering elements impedes the flow of smoke through the filter and requires that the smoker apply additional suction to withdraw his normal amount of smoke. If enough adsorbent is included to remove considerable quantities of deleterious materials, the draw resistance is well above a desirable and comfortable level.

On the other hand, segregation of the adsorbent into a portion of the filter separated from the fibrous portion thereof, has pronounced deleterious effects on the taste of the smoke. When adsorbents such as charcoal, alumina, or silica gel are incorporated in a cigarette filter (segregated from the cellulose acetate filter) in sufficient quantities to considerably reduce the levels of gaseous materials, it is found that the taste of the smoke stream is far from pleasing to experienced smoke tasters. Although some irritating factors are reduced, the smoke is found to have an astringent, bitter, drying taste. Other mineral adsorbents have a similar overall effect, with minor modification in taste and aroma depending on the particular adsorbent. The general result is that a pleasing smoke is obtained only when the amount of adsorbent is reduced to the point where it is well in minor proportion to the fibrous filtering agent. When present at such diminished levels, it is insufficiently effective in removing undesirable smoke constituents.

The problem then is to find a filter which does not rely on adsorption alone for its filtering action but which, nevertheless, is highly efficient in removing particulate, vapor and gaseous pollutants from the atmosphere. The filter should have application to the control of industrial pollution in general, and to the automobile industry in particular, and should also be of use in the cigarette industry. In this latter regard, the filter should be inexpensive, tasteless and should not add significantly to the amount of draw required from the cigarette.

SUMMARY OF THE INVENTION

As a solution to this problem an illustrative embodiment of the invention comprises a fluid filter which comprises cellulose which has been oxidized with an inorganic nitrate of the formula Me(NO$_3$)n where Me represents a metal atom selected from the group consisting of manganese, nickel, aluminum, calcium, iron, sodium, zinc and copper and $n$ is 1, 2, 3 etc. depending on the valence number of the corresponding metal.

Yet another embodiment of the invention comprises a method of manufacturing a filter material comprising the steps of forming an aqueous solution of an inorganic nitrate of the formula Me(NO$_3$)$n$ where Me represents a metal atom selected from the group consisting of Manganese, Nickel, Aluminum, Calcium, Iron, Sodium, Zinc and Copper and n equal 1, 2 or 3, etc. depending on the valence number of the corresponding metal; soaking a cellulosecontaining material in said aqueous solution until said material is substantially completely oxidized; and heating said material to evaporate off the aqueous solution remaining and decompose the nitrate.

The invention and its mode of operation will be more fully understood from the following detailed description.

DETAILED DESCRIPTION OF THE INVENTION

The instant invention arose out of research which was directed towards finding an improved cigarette filter. It was quickly realized, however, that the filter material according to this invention may advantageously be used, by way of example and not of limitation, in the exhaust path of an internal combustion engine; in the flue or smoke-stack of an industrial plant; and at the input or output of an air-conditioning unit,
or the like. When so used, the filter is highly efficient in removing unwanted gaseous and particulate pollutants.

The filter will be described in connection with its use as a cigarette filter, however, its use as a filtering medium for other applications should be borne in mind at all times.

The invention is based on the oxidization of cellulose with nitric acid in which the nitric acid oxidizes the primary hydroxyl group to carboxyl without affecting the rest of the molecule appreciably, except for a considerable reduction in chain length.

The formula may be stated as follows:

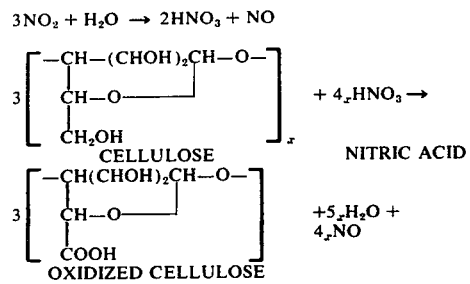

Cellulose comprises at least one third of all vegetable matter. Cotton and wood, the principal sources of industrial cellulose, are about 90% and 50% cellulose, respectively. The preferred source of cellulose for this invention is chemical cotton which comprises cotton linters, which are the short fibers removed from cotton seeds, after the long fibers have been taken off by ginning for use in textiles.

The cotton linters are purified by pressure digestion at 130°C to 180°C with a solution containing 2% to 5% sodium hydroxide and by a subsequent bleaching to remove color bodies. Chemical cotton contains about 99% alpha-cellulose.

Raw cotton, which typically contains less than 10% of non-cellulisic impurities such as proteins, fats, waxes, pectin, carbohydrates, etc., may also be used, but is less desirable than chemical cotton. Wood pulps prepared by the sulphite process, the soda process or the sulphate process may also be used, but as such pulps typically contain less than 88% alpha-cellulose. They are also less desirable than the chemical cotton.

Nitric acid is, of course, a powerful oxidizing agent; it oxidizes nearly all of the metals except platinum, rhodium, indium, tantalum and gold. When heated to high temperatures, nitrates are also strong oxidizing agents comparable to nitric acid itself. Inorganic nitrates, may be defined as chemical compounds of the formula Me(-NO$_3$)n.$m$ H$_2$O where Me represents a metal atom and $n$ may be 1, 2, or more, depending on the valence number of the metal. At ordinary temperatures nitrates are crystalline solids or solutions and may be white or colored, depending on the metal constituent. As a group they are the most water soluble of all metal salts and are prepared by reaction of the desired metal, its oxide or its carbonate with nitric acid.

As will be seen from the specific examples to be given below, the filter material according to this invention is prepared by reacting cotton with a metallic nitrate to form a complex organic compound. The reaction is not fully understood, but as previously stated, is believed to be essentially an oxidization of the cellulose by the nitric acid or the metallic nitrate.

The resulting complex organic compound may be mixed with other chemical constituents to modify the filtering properties or it may be used alone. Again, the reaction between the filtering material and the pollutants is not fully understood. It is believed to be a true reaction (not merely an adsorption) in which the pollutants are oxidized. This view is strengthened by the results of gas cheomatography experiments made on the fluid to be filtered before and after filtration. These experiments indicate an increase in the percentage of oxygen which could not occur in an adsorption process alone.

The inability to properly characterize the filtering material and the manner in which it operates is, of course, no bar to patentability nor to the successful use of the material in filters of various types.

EXAMPLE I 4.5 grams of cotton was soaked in 100 ml of a 50% by weight manganese nitrate solution for approximately 12 hours, or until the cotton began to decompose. Next the partially decomposed cotton was placed in a porcelain dish and heated on a hotplate to a temperature of approximately 250°C for approximately 3 hours, or until all the remaining manganese nitrate solution had evaporated, and the remaining nitrate decomposed. During the decomposition of nitrate $NO_2$ gas was observed.

The material remaining was then ground into a fine black powder and mixed with water to form a suspension.

Fresh cotton was then soaked in the suspension and dried to form the filtering material.

EXAMPLE II

In the process disclosed in Example I, rather than form a suspension of the oxidized cotton in water, the black powder is ground with fresh cotton to impregnate the cotton with the powdered material and form the filter. For use as a cigarette filter, from 60 to 350, preferably 150 mg of the black, oxidized cotton is ground into about 60 mg of cotton.

EXAMPLE III 70 ml of 50% manganese nitrate $(MnNO_3)_2.6H_2O$ solution was mixed with 30 ml of a 85% solution by weight of phosphoric acid $(H_3PO_4)$.

Next 4.5 mg of cotton was added to the mixture and left to soak for approximately 12 hours or until the cotton began to decompose.

The resulting gel was placed in a porcelain dish and heated on a hotplate at a temperature of approximately 250°C until the remaining liquids were evaporated and the nitrate decomposed. A yellowish-brown powder was obtained which may be used as the filtering agent.

EXAMPLE IV

A filter was formed by mixing the following ingredients:
43.4 grams of the black powder of Example I
2.1 grams pure shredded tobacco
34.4 grams of yellow-brown powder of Example II
1.8 grams charcoal
17.2 grams 120 mesh pumice
1.1 grams granular thermoplastic powder The charcoal was included to remove any odor which may be added to the taste of the cigarette smoke by the other ingredients. The 120 mesh, partially-ground, pumice is an inert material added to increase the porosity of the filter. The thermoplastic material was obtained for convenience, from commercially available HUNT-brand xerographic toner, but obviously other thermoplastic powders could also be used.

EXAMPLE V

12 Ml of 50% manganese nitrate $(Mn(NO_3)_2.6H_2O$ was mixed with 0.5 g charcoal and 0.5 g cotton and left for approximately 12 hours, or until the cotton began to dissolve. Next, the mixture was placed in a porcelain dish and heated on a hotplate at a temperature of approximately 250°C until all the remaining liquid had been evaporated and the Nitrate decomposed.

The material remaining was black in color and when ground yielded a fine black powder, similar in appearance to that obtained in Example I.

EXAMPLE VI

Zinc nitrate $(Zn(NO_3)_2.6H_2O)$ was dissolved in distilled water to form a 50% solution by weight.

10 Ml of the above solution was mixed with 0.5 grams of cotton and permitted to stand for approximately 12 hours, or until the cotton began to decompose. Next, the mixture was placed in a porcelain dish and heated on a hotplate until the remaining solution was evaporated and Nitrate decomposed.

A greyish-white powder was obtained and used as the filter material.

EXAMPLE VII

125 Grams of aluminum nitrate $(Al(NO_3)_3.9H_2O)$ and 7.5 grams of cotton was dissolved in a mixture of 150 ml. of $H_2O$ and 16 ml of concentrated nitric acid $(HNO_3)$ 70% strength.

After about 30 minutes, the partially dissolved cotton was removed and placed in a porcelain dish. The dish was then heated on a 250°C hotplate until the remaining liquid had evaporated and nitrate decomposed. The resulting solid material was ground to a fine white powder to provide the filter material.

EXAMPLE VIII

The mixture set forth in Example VII was permitted to remain in solution for approximately 90 minutes, or until the cotton had totally dissolved.

The mixture was then evaporated on a hotplate, as in Example VII. During evaporation, $NO_2$ gas was observed being driven off. Again, the residue was ground to a fine white powder.

EXAMPLE IX

Ferric nitrate $(Fe(NO_3)_3.9H_2O)$ was dissolved in distilled water to form a 50% solution by weight.

5 Grams of cotton were then dissolved in 100 ml of concentrated 70% Nitric Acid $(HNO_3)$. Then, 10 ml. of the $Fe(NO_3)_3.9H_2O$ solution were mixed with 15 ml. of the $HNO_3$-cotton mixture and an additional 1.75 grams of cotton added. The resultant material was permitted to stand for approximately 12 hours, or until the cotton was completely dissolved. Next, the remaining material was heated on a hotplate at 250°C until all remaining liquid was evaporated and Nitrate decomposed.

A brownish-yellow powder was obtained which was used as a filter material.

EXAMPLE X

100 Grams of calcium nitrate ($Ca(NO_3)_2 \cdot 4H_2O$) was dissolved in 100 ml. of $H_2O$.

2.25 Grams of cotton was then added to 50 ml. of the above solution and 3 ml of concentrated 70% Nitric Acid. The cotton dissolved in the solution.

An additional 2.5 grams of cotton was then soaked in the solution for 2 hours. Excess $HNO_3$ and $Ca(NO_3)_2$ were then removed by a water rinse.

The cotton was then permitted to dry and after a flash fire burned to dark grey powder which formed the filter material.

EXAMPLE XI

100 Grams of copper nitrate ($Cu(NO_3)_2 \cdot 3H_2O$) was dissolved in 100 ml. $H_2O$. Next, 1.75 grams of cotton were placed in 20 ml. of the above solution and permitted to stand for 12 hours.

The resulting mass was placed in a porcelain dish and heated on a hotplate at 250°C. The mixture burned fiercely leaving a dark brown residue which was then ground into a fine powder.

EXAMPLE XII

10 Grams of sodium nitrate ($NaNO_3$) were dissolved in 20 ml. of $H_2O$.

0.25 Grams of cotton were dipped in the above solution for 30 minutes and then placed in a crucible and dried.

Next, to remove any excess $NaNO_3$ remaining, the cotton was subjected to a water rinse and another drying cycle. Finally, approximately 3 drops of the nitric acid solution described in Example IX was added to the cotton, which was quickly oxidized. After approximately 30 minutes, the crucible was placed in a furnace at 400°C and heated until all remaining liquid had been evaporated and the nitrate decomposed, yielding the filter material which was grayish brown in color.

The filter material which was produced in Examples III, V, VI, VII, VIII, IX, XI, and XII may be mixed with water to form a suspension and cotton or other similar material, dipped in the suspension to form the actual filter, as described in Examples I and II.

Alternatively, tobacco, charcoal, pumice powder, etc. may be used to dilute the filtering material as described in Example IV.

Actually, the filter material produced according to processes of this invention is so efficient that some cigarette smokers may find its tar and nicotine removing abilities objectionable. In that event, the filter material may be diluted by the addition of more and more inert materials, such as tobacco or pumice. Of course, this increases the amount of harmful material in the smoke.

Unlike conventional adsorption-type filters, which are generally spent after one cigarette, it is an important aspect of this invention that the filter material remains active and may be used for two, three or more cigarettes. It is ideally suited, therefore, for use as a disposable filter element for pipes, cigar holders, cigarette holders, etc.

The filter arrangements for use with automobiles, air conditioners, etc. are entirely analogous and are not shown in detail. It will, of course, be necessary to utilize different kinds and quantities of inert filter material, but this is well within the scope of a person skilled in the art.

The amount of filtration attainable with the filter material according to this invention is truly spectacular.

Table A, below, lists the results of a laboratory analysis on commercially available cigarettes, both filtered and unfiltered, as well as the same commercially available unfiltered cigarette in combination with several different types of the filter according to this invention.

TABLE A

| Cigarette | Tars* -mg/ Cigarette | Concentration % Volume/Volume | | | | |
|---|---|---|---|---|---|---|
| | | Puffs | Oxygen | Methane & Nitric Oxide | Carbon Monoxide | Carbon Dioxide |
| Commercial Cigarette A (No Filter) | 13.2 | 3 | 14.0 | .35 | 3.3 | 5.8 |
| | | 6 | 12.0 | .39 | 3.2 | 9.7 |
| Commercial Cigarette B (No Filter) | 17.9 | 3 | 14.0 | .52 | 2.7 | 8.3 |
| | | 6 | 12.0 | .49 | 3.2 | 11.2 |
| Commercial Cigarette A (Short Filter No. 1) | 0.4 | 3 | 16.0 | .25 | 1.2 | 4.6 |
| | | 6 | 14.0 | .38 | 1.8 | 6.7 |
| Commercial Cigarette A (Short Filter No. 2)** | 3.5 | 3 | 14.0 | .52 | 3.5 | 8.8 |
| | | 6 | 14.0 | .49 | 3.4 | 9.3 |
| Commercial Cigarette A (Long Filter No. 4) | 4.4 | 3 | 14.0 | .34 | 3.2 | 8.6 |
| | | 6 | 12.0 | .61 | 5.4 | 12.3 |
| Commercial Cigarette A (Long Filter No. 4-2) | 3.3 | 3 | 14.0 | .38 | 2.5 | 8.4 |
| | | 6 | 12.0 | .62 | 3.8 | 10.4 |
| Commercial Cigarette D (Filtered) | 12.4 | 3 | 14.0 | .45 | 2.6 | 8.3 |
| | | 6 | 12.0 | .57 | 4.3 | 10.2 |

*Material collected on a Cambridge Filter after 6 puffs (1 puff - 35 cc in 2 sec.)
**Previously smoked The sampling and analyses were performed as follows:

The cigarette was inserted into a special Gelman holder, containing a tared Cambridge Filter. The holder was attached to a vacuum system drawing one 35 cc puff in 2 seconds every minute. Samples of the third and sixth puff were removed in glass syringes, and injected onto chromatographic columns for analysis.

The oxygen, methane-nitric oxide, and carbon monoxide analysis was achieved on a molecular sieve column maintained at $\pi°C$. Separation of other constituents, except carbon dioxide, was achieved on a 12 ft. × ¼ in. Porapak Q Column 2 in. Porapak R Column programmed from 90°C to 220°C at 30°C/minute. The carbon dioxide was separated on a 6 ft × ¼ in. silica gel column maintained at 90°C.

The tar values were obtained by weighing the Cambridge Filter before and after smoking the cigarette.

Table B, below, gives the result of a chromatographic analysis on the smoke of the same cigarettes tested in Table A.

through III. Similar, or better, results have been obtained with the filter material described in Examples IV through XII.

The various times, temperatures, concentrations and masses in the Examples are not unduly critical and wide variation is possible. Similarly, the percentages of the various constituents in the filters are not critical and wide variation is again possible.

One skilled in the art may make various changes and substitutions in the processes disclosed, without departing from the spirit and scope of the invention.

What is claimed is:

1. A method of filtering noxious, carcinogenic or objectionable gases from a mixture of gases comprising the step of passing said mixture of gases through a filter containing the complex metallic product resulting from

TABLE B

| | | | | | | | | | |
|---|---|---|---|---|---|---|---|---|---|
| | | | | | | | PEAK HEIGHT (DIVISIONS) | | |
| Retention Time | Constituents | Drag | Commercial Cig. A No Filter | Commercial Cig. B No Filter | Commercial Cig. A + No. 1 Short Filter | Commercial Cig. A + No. 2 Short Filter | Commercial Cig. A + No. 4 Long Filter | Commercial Cig A + No. 4-2 Long Filter | Commercial Cig. D Filtered |
| 2.0 | Unidentified | 3rd | 1280 | 1600 | 815 | 1570 | 1180 | 1200 | 1380 |
| | | 6th | 1600 | 1600 | 1170 | 1540 | 1600 | 1600 | 1600 |
| 4.4 | Unidentified | 3rd | 140 | 208 | 100 | 180 | 156 | 172 | 220 |
| | | 6th | 180 | 252 | 128 | 188 | 212 | 220 | 272 |
| 5.6 | Unidentified | 3rd | 212 | 262 | 144 | 240 | 196 | 192 | 400 |
| | | 6th | 240 | 400 | 160 | 232 | 263 | 256 | 400 |
| 9.5 | | 3rd | 176 | 216 | 120 | 200 | 160 | 164 | 204 |
| | Hydrogen Cyanide | 6th | 196 | 248 | 144 | 192 | 220 | 220 | 236 |
| 9.8 | | 3rd | 144 | 176 | 100 | 160 | 124 | 124 | 164 |
| | | 6th | 156 | 188 | 132 | 168 | 164 | 176 | 192 |
| 10.0 | Unidentified | 3rd | 48 | 64 | 32 | 48 | 48 | 56 | 44 |
| | | 6th | 56 | 52 | 32 | 48 | 68 | 54 | 52 |
| 10.5 | Formaldehyde | 3rd | 12 | 16 | 4 | 8 | 4 | 8 | 8 |
| | | 6th | 12 | 20 | 8 | 12 | 12 | 12 | 24 |
| 11.2 | Acetaldehyde | 3rd | 170 | 192 | 100 | 194 | 130 | 190 | 162 |
| | | 6th | 164 | 170 | 104 | 172 | 200 | 200 | 182 |
| 12.6 | Unidentified | 3rd | 68 | 84 | 48 | 78 | 60 | 72 | 0 |
| | | 6th | 72 | 90 | 56 | 72 | 82 | 90 | 82 |
| 13.0 | Unidentified | 3rd | 50 | 56 | 34 | 56 | 40 | 46 | 56 |
| | | 6th | 50 | 62 | 40 | 50 | 56 | 58 | 42 |
| 14.0 | Unidentified | 3rd | 16 | 18 | 8 | 18 | 6 | 22 | 10 |
| | | 6th | 16 | 20 | 10 | 20 | 30 | 24 | 14 |
| 15.0 | Acrolein | 3rd | 84 | 92 | 52 | 98 | 60 | 104 | 82 |
| | | 6th | 78 | 94 | 60 | 80 | 110 | 98 | 84 |
| 15.8 | Unidentified | 3rd | 2 | 2 | 1 | 2 | 1 | 4 | 2 |
| | | 6th | 2 | 2 | 1 | 2 | 2 | 4 | 2 |
| 17.0 | Unidentified | 3rd | 102 | 98 | 74 | 114 | 66 | 110 | 80 |
| | | 6th | 82 | 90 | 66 | 82 | 98 | 122 | 86 |
| 20.4 | Unidentified | 3rd | 18 | 12 | 10 | 20 | 8 | 20 | 12 |
| | | 6th | 10 | 12 | 10 | 12 | 22 | 16 | 12 |

It will be noted that when applicant's filter is used, the tar content drops from a high of 17.9 mg. to a dramatic low of 0.4 mg. Similarly, the oxygen content of the smoke increases from a concentration of 14.0% to 16.0%; carbon dioxide drops from a high of 3.3% to a low of 1.2%; carbon dioxide drops from a high of 5.8% to a low of 4.6% and on subsequent puffs when the unfiltered cigarette rises to 11.2%, the filtered cigarettes according to this invention only rises to 6.7%. Methane and nitric oxide also drop from a high of 0.52% to 0.25%.

Acralein, an important carcinogen, drops from a high of 92 to a low of 52 while hydrogen cynanide drops from a high of 176 to a low of 120. Formaldehyde similarly drops from 14 to 12.

In these analytic tests, the filters used were similar to the manganese nitrate filters described in Examples I re-acting cellulose with an inorganic nitrate of the formula $Me(NO_3)_n$ where Me represents a metal atom selected from the group consisting of manganese, nickel, aluminum, calcium, iron, sodium, zinc, and copper and $n$ is a number corresponding to the valence number of the metal atom.

2. The method of claim 1 wherein said complex metallic product includes an inert granular material to increase the porosity of the filter.

3. The method according to claim 2 wherein said inert granular material comprises pumice.

4. The method according to claim 1 wherein said complex metallic product further includes activated charcoal to remove any nitrogen-based gases added to the mixture of gases by said inorganic nitrate as it reacts with the mixture of gases to be filtered.

* * * * *